(12) United States Patent
Potyrailo et al.

(10) Patent No.: US 7,496,938 B2
(45) Date of Patent: Feb. 24, 2009

(54) MEDIA DRIVE WITH A LUMINESCENCE DETECTOR AND METHODS OF DETECTING AN AUTHENTIC ARTICLE

(75) Inventors: Radislav Potyrailo, Niskayuna, NY (US); Marc Wisnudel, Clifton Park, NY (US)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 349 days.

(21) Appl. No.: 11/238,261

(22) Filed: Sep. 29, 2005

(65) Prior Publication Data

US 2006/0041898 A1     Feb. 23, 2006

Related U.S. Application Data

(63) Continuation-in-part of application No. 10/709,208, filed on Apr. 21, 2004, now Pat. No. 7,175,086, and a continuation-in-part of application No. 10/723,682, filed on Nov. 24, 2003, now Pat. No. 7,218,589.

(51) Int. Cl.
*G11B 7/24*     (2006.01)
*G11B 7/08*     (2006.01)

(52) U.S. Cl. .................. 720/658; 720/718; 430/270.11

(58) Field of Classification Search .............. 250/458.1, 250/462.1, 483.1, 486.1, 487.1, 484.2; 720/718, 720/719, 658; 430/270.11, 270.15; 369/121; 235/454
See application file for complete search history.

(56) References Cited

U.S. PATENT DOCUMENTS

| | | | |
|---|---|---|---|
| 3,635,895 A | 1/1972 | Kramer et al. | |
| 3,928,226 A | 12/1975 | McDonough et al. | |
| 4,001,184 A | 1/1977 | Scott | |
| 4,127,773 A | 11/1978 | West | |
| 4,217,438 A | 8/1980 | Brunelle et al. | |

(Continued)

FOREIGN PATENT DOCUMENTS

EP     0 121 261 A2     10/1984

(Continued)

OTHER PUBLICATIONS

International Search Report; International Application No. PCT/US2006/037955; International Filing Date Sep. 26, 2006; Date of Mailing Feb. 14, 2007; 5 pages.

(Continued)

*Primary Examiner*—William J Klimowicz (57) ABSTRACT

A media drive is disclosed. In one embodiment, a media drive can comprise: a disk holder, a drive laser, a disk reader, and a luminescence detector. The disk holder can be capable of applying a rotational force to a media disk. The drive laser is disposed so that light from the laser will be incident on the media disk when it is disposed in the disk holder. The disk reader is disposed to receive data from the media disk. A method for authenticating a media disk is also disclosed. The method can comprises: disposing the article in a reader, illuminating at least a portion of the article with the information reader, monitoring a luminescence emission of the illuminated article, and determining if the luminescence emission is consistent with an authentic article. If a luminescent material is present, the information reader excites the luminescent material to create a luminescence emission.

13 Claims, 5 Drawing Sheets

U.S. PATENT DOCUMENTS

| | | | |
|---|---|---|---|
| 4,238,524 A | 12/1980 | LaLiberte et al. ............... 427/7 |
| 4,600,632 A | 7/1986 | Paul et al. |
| 4,699,510 A | 10/1987 | Alguard ...................... 356/73 |
| 4,774,315 A | 9/1988 | Miller |
| 5,005,873 A | 4/1991 | West ........................... 283/92 |
| 5,028,690 A | 7/1991 | Gallucci |
| 5,043,203 A | 8/1991 | Fyvie et al. |
| 5,137,364 A | 8/1992 | McCarthy |
| 5,142,018 A | 8/1992 | Sakashita et al. |
| 5,151,491 A | 9/1992 | Sakashita et al. |
| 5,201,921 A | 4/1993 | Luttermann et al. ............. 8/506 |
| 5,314,072 A | 5/1994 | Frankel et al. ............. 209/44.1 |
| 5,326,692 A | 7/1994 | Brinkley et al. |
| 5,329,127 A | 7/1994 | Becker et al. ............ 250/459.1 |
| 5,356,668 A | 10/1994 | Paton et al. |
| 5,380,795 A | 1/1995 | Gosens et al. |
| 5,510,619 A | 4/1996 | Zachmann et al. ...... 250/339.08 |
| 5,532,998 A | 7/1996 | Durham |
| 5,548,106 A | 8/1996 | Liang et al. |
| 5,553,714 A | 9/1996 | Cushman et al. ............. 209/577 |
| 5,573,909 A | 11/1996 | Singer et al. ..................... 435/6 |
| 5,640,010 A | 6/1997 | Twerenbold |
| 5,644,017 A | 7/1997 | Drumright et al. |
| 5,668,202 A | 9/1997 | Hirata et al. |
| 5,703,229 A | 12/1997 | Krutak et al. ............... 540/140 |
| 5,706,266 A | 1/1998 | Brownstein et al. |
| 5,815,484 A | 9/1998 | Smith et al. |
| 5,838,451 A | 11/1998 | McCarthy |
| 5,892,577 A | 4/1999 | Gordon |
| 5,918,960 A | 7/1999 | Hopwood et al. |
| 6,099,930 A | 8/2000 | Cyr et al. ................... 428/64.1 |
| 6,160,787 A | 12/2000 | Marquardt, Jr. et al. |
| 6,181,662 B1 | 1/2001 | Krieger et al. |
| 6,219,329 B1 | 4/2001 | Tanaka et al. |
| 6,326,605 B1 | 12/2001 | Modlin et al. |
| 6,327,031 B1 | 12/2001 | Gordon |
| 6,342,349 B1 | 1/2002 | Virtanen |
| 6,355,420 B1 | 3/2002 | Chan |
| 6,359,745 B1 * | 3/2002 | Thomas et al. ................ 360/69 |
| 6,380,547 B1 | 4/2002 | Gonzalez et al. |
| 6,469,969 B2 | 10/2002 | Carson et al. |
| 6,500,547 B1 | 12/2002 | Potyrailo et al. |
| 6,514,617 B1 | 2/2003 | Hubbard et al. ............. 428/412 |
| 6,543,351 B2 | 4/2003 | Haycock et al. |
| 6,589,626 B2 | 7/2003 | Selinfreund et al. |
| 6,603,126 B2 | 8/2003 | Yamada et al. ............... 250/372 |
| 6,610,351 B2 * | 8/2003 | Shchegolikhin et al. ........ 427/7 |
| 6,612,494 B1 | 9/2003 | Outwater |
| 6,638,593 B2 | 10/2003 | Selinfreund et al. |
| 6,707,539 B2 | 3/2004 | Selinfreund et al. |
| 7,086,073 B2 * | 8/2006 | Benedikt et al. ............. 720/719 |
| 7,157,086 B2 * | 1/2007 | Lobb et al. ............... 424/144.1 |
| 7,218,589 B2 * | 5/2007 | Wisnudel et al. ......... 369/53.21 |
| 2001/0043533 A1 * | 11/2001 | Hahnfeld et al. ......... 369/53.22 |
| 2002/0025490 A1 | 2/2002 | Shchegolikhin et al. |
| 2002/0173040 A1 | 11/2002 | Potyrailo et al. |
| 2003/0012562 A1 | 1/2003 | Lawandy et al. ............. 386/126 |
| 2003/0076775 A1 | 4/2003 | Sato et al. |
| 2003/0136837 A1 | 7/2003 | Amon et al. |
| 2004/0058058 A1 | 3/2004 | Shchegolikhin et al. |
| 2004/0083377 A1 | 4/2004 | Wu et al. |
| 2004/0094626 A1 | 5/2004 | Sillman et al. |
| 2004/0126701 A1 * | 7/2004 | Lee et al. ............... 430/270.15 |
| 2004/0156081 A1 | 8/2004 | Bril et al. |
| 2004/0255317 A1 * | 12/2004 | Benedikt et al. ............. 720/718 |
| 2005/0026154 A1 | 2/2005 | Bruhn et al. |
| 2005/0109984 A1 | 5/2005 | Potyrailo et al. ....... 252/299.01 |
| 2005/0110993 A1 | 5/2005 | Dorsel |
| 2005/0111342 A1 | 5/2005 | Wisnudel et al. |
| 2005/0163026 A1 | 7/2005 | Oshima et al. |
| 2007/0134594 A1 * | 6/2007 | Lee et al. ............... 430/270.18 |

FOREIGN PATENT DOCUMENTS

| | | |
|---|---|---|
| EP | 0 181 288 B1 | 5/1986 |
| EP | 0 181 228 B1 | 6/1986 |
| EP | 0 438 225 A1 | 7/1991 |
| EP | 449291 A2 * | 10/1991 |
| EP | 0 990 890 A1 | 4/2000 |
| EP | 1 178 429 A2 | 2/2002 |
| EP | 1 189 062 A1 | 3/2002 |
| EP | 1 220 165 A2 | 7/2002 |
| GB | 1 170 965 | 11/1969 |
| GB | 2 264 558 A | 9/1993 |
| GB | 2 330 408 A | 4/1999 |
| JP | 07192385 A * | 7/1995 |
| JP | 08124239 A * | 5/1996 |
| JP | 2002150616 A * | 5/2002 |
| WO | WO 98/12559 | 3/1998 |
| WO | WO 98/31011 | 7/1998 |
| WO | WO 99/35499 | 7/1999 |
| WO | WO 00/14734 | 3/2000 |
| WO | WO 00/14736 | 3/2000 |
| WO | 00/19430 | 4/2000 |
| WO | WO 0171646 A1 | 9/2001 |
| WO | WO 0180236 A1 * | 10/2001 |
| WO | WO 00/21086 | 4/2002 |
| WO | 02/098671 A2 | 12/2002 |
| WO | WO 03/087888 A2 | 10/2003 |
| WO | WO 03/105075 | 12/2003 |

OTHER PUBLICATIONS

Written Opinion of the International Searching Authority; International Application No. PCT/US2006/037955; International Filing Date Sep. 26, 2006; Date of Mailing Feb. 14, 2007; 5 pages.

International Search Report; International Application No. PCT/US2005/013353; International Filing Date Jul. 4, 2005; Date of Mailing Sep. 9, 2005; 5 pages.

U.S. Appl. No. 10/889,913, filed Jul. 13, 2004; Sriramakrishna Maruvada et al.; Authenticatable Article and Method of Authenticating (Available in Image File Wrapper (IFW)).

U.S. Appl. No. 10/987,282, filed Nov. 12, 2004; van de Grampel et al.; Authenticatable Media and Method of Authenticating (Available in Image File Wrapper (IFW)).

JP 2000076659; Mar. 14, 2000; English Abstract only; 1 page.

U.S. Appl. No. 10/723,682, filed Nov. 24, 2003, Marc Wisnudel et al., "Authenticable Optical Dis. System for Authenticating and Optical Disc and Method Thereof", 20 pages.

Billboard, 114, 43, 46(1); Oct. 26,k 2003; ISSN: 0006-2510; Copyright 2002 VNU Business Media; Universal Italy initiatives encourage price cutting: president/CEO calls for other labels to follow his company's lead. (International) 1 page.

http//www.taosinc.com/product detaiol.asp?cateid=11&proid+12; "Color Sensors"; TAOSin / Texas Advanced Optoelectronic Solutions; Feb. 23, 2004 (1 page).

Kevin M. Cantrell, et al.: "Te Slim Spectrometer"; Analytical Chemistry, vol. 75, No. 1, Jan. 1, 2003, pp. 27-35.

Letter to the Editor, Financial Times, USA Ed1 20021119U112.036 ed, p. 12; Nov. 19, 2002; Journal Code: FFT; Industry Fails to provide user-friendly music 1 page.

Online Reporter, p NA: Aug. 23, 2003; Newsletter (United States) Kviar Sees Custom CD Kiosks All over Brazil; Copyright 2003 G2 Intelligence, Inc. (1 page).

South China Morning Post, 11, Jul. 17, 2001; "Creative thinking the magic ingredient for modest enterprises looking to establish their own market niche Spark of originality fires smart ventures"; Copyright 2001 (2 pages).

USCD Scientists Develop Novel Way to Screen Molecules Using Conventional CDs and Compact Disk Players, Science and Engineering UCSD Press Release, Aug. 20, 2003.

La Clair, et al., "Molecular Screening on a compact disc," Orig. Biomol. Chem. 2003, 1 (Advance Article)(Abstract).

La Clair, et al., "Molecular Screening on a compact disc," Org. Biomol. 2003, 1, (Advance Article)(Paper).

Duffy, et al. "Microfabricated Centrifugal Microfluidic Systems: Characterization and Multiple Enzymatic Assays," anal. Chem. 71:4669-4678 (1999).

La Clair, et al., "Molecular Screening on a compact disc," Org. Biomol. Chem. 2003, 1:3244-3249.

International Search Report; International Application No. PCT/US2004/035029; Applicant's File Reference 08CL 140323; International Filing Date Oct. 22, 2004; Date of Mailing Apr. 22, 2005.

* cited by examiner

- 650-nm laser
- 780-nm laser

MEDIA DRIVE WITH A LUMINESCENCE DETECTOR AND METHODS OF DETECTING AN AUTHENTIC ARTICLE

CROSS-REFERENCE TO RELATED APPLICATIONS

This application is a continuation-in-part application of and claims priority to, U.S. patent application Ser. No. 10/723,682, filed Nov. 24, 2003, and is a continuation-in-part application of and claims priority to, U.S. patent application Ser. No. 10/709,208, filed Apr. 21, 2004. The entire contents of both of these applications are hereby incorporated by reference.

BACKGROUND OF THE INVENTION

In the field of data storage media, digital content owners, such as music companies, movie studios, video game manufacturers, computer software manufacturers, and the like, desire increased flexibility in the distribution of their digital content onto various forms of data storage media. A major problem confronting the various makers and users of data storage media such as compact discs (CD), digital versatile discs (DVD), enhanced video discs (EVD), recordable compact discs (CD-R) and recordable digital versatile discs (DVD-R) is the unauthorized reproduction or copying of information by unauthorized manufacturers, sellers, and/or users. Such unauthorized reproduction or duplication of data storage media is often referred to as piracy. Piracy may occur in a variety of ways, including consumer level piracy at the point of end use as well as wholesale duplication of data, substrate and anti-piracy information at the commercial level. Regardless of the manner, piracy of data storage media deprives legitimate digital content providers and manufacturers of significant revenue and profit.

Attempts to stop piracy at the consumer level have included the placement of electronic anti-piracy signals on information carrying substrates along with the information sought to be protected. The machine readers and players of such data storage media are configured to require the identification of such anti-piracy signals prior to allowing access to the desired information. Theoretically, consumer level duplications are unable to reproduce these electronic anti-piracy signals on unauthorized copies and hence result in duplicates and copies that are unusable.

However, numerous technologies to thwart such consumer level anti-piracy technologies have been and continue to be developed. Moreover, commercial level duplications have evolved to the point that unauthorized duplicates may now contain the original electronic anti-piracy circuit, code, etc. For example, commercial level duplication methods include pit copying, radio frequency (RF) copying, "bit to bit" copying and other mirror image copying techniques which result in the placement of the anti-piracy signal on the information carrying substrate of the duplicate along with the information sought to be protected. Other technologies commonly used by hackers include the modification of the computer code in order to remove anti-piracy (also referred to as copy-protection or copy-proofing) features and enable unlimited access to the data.

It would be desirable to have a data storage media that can be easily identified as to being authentic or pirated. One anti-piracy technology aimed at combating these more sophisticated consumer and commercial level reproduction and copying practices involves the placement of 'tags' or authentication markers in substrates used in the construction of data storage media. Such tags or authentication markers can be detected at one or more points along the data storage media manufacturing or distribution chain or by the end use reader or player used to access the data on a particular data storage media.

The automated identification of plastic compositions used in data storage media is very desirable for a variety of applications, such as recycling, tracking the manufacturing source, antipiracy protection, and others. Furthermore, it may be desirable for automated authentication of the data storage media.

Despite the foregoing, there still remains a desire for an authentication detector and a method for using the same.

SUMMARY

This disclosure relates to an authentication system, a data device, and a method of using the data device. In one embodiment, a media drive can comprise: a disk holder, a drive laser, a disk reader, and a luminescence detector. The disk holder can be capable of applying a rotational force to a media disk. The drive laser is disposed so that light from the laser will be incident on the media disk when it is disposed in the disk holder. The light is capable of being used for recording on the media disk, playback of information on the media disk, or both. The disk reader is disposed to receive data from the media disk.

In one embodiment, the method for authenticating a media disk can comprise: disposing the media disk in a media drive, rotating the disk, illuminating at least a portion of the disk with the drive laser, monitoring a luminescence emission (if any) of the illuminated media disk, and determining if the luminescence emission is consistent with an authentic disk.

In another embodiment, a method for authenticating an article, comprises: disposing the article in a reader, illuminating at least a portion of the article with the information reader, monitoring a luminescence emission of the illuminated article (for example, over time), and determining if the luminescence emission is consistent with an authentic article. If a luminescent material is present, the information reader excites the luminescent material to create a luminescence emission. The reader can comprise an article holder, an information reader, and a luminescence detector.

The above described and other features are exemplified by the following figures and detailed description.

BRIEF DESCRIPTION OF THE DRAWINGS

Refer now to the figures, which are exemplary embodiments, and wherein the like elements are numbered alike.

DETAILED DESCRIPTION

It is noted that the terms "first," "second," and the like, herein do not denote any amount, order, or importance, but rather are used to distinguish one element from another, and the terms "a" and "an" herein do not denote a limitation of quantity, but rather denote the presence of at least one of the referenced item. Additionally, all ranges disclosed herein are inclusive and combinable (e.g., the ranges of "up to 25 wt %, with 5 wt % to 20 wt % desired," are inclusive of the endpoints and all intermediate values of the ranges of "5 wt % to 25 wt %," etc.). The modifier "about" used in connection with a quantity is inclusive of the stated value and has the meaning dictated by the context (e.g., includes the degree of error associated with measurement of the particular quantity). "Color" in a medium is intended to mean that at least a portion of the visible energy directed at the medium is affected by the medium. The visible energy can be affected for example, by absorption, scattering, diffusion and/or reflection of certain wavelengths, thus creating the "color". Note that even a "colorless/clear" medium or a medium with a parts per million range loading of blue dye will absorb light and therefore comprise a "color". Similarly, a metal reflective layer or a CD-R dye interacts with a visible light source, so any medium including any of these are considered to comprise a "color". Luminescence is the emission of electromagnetic radiation by an object or substance exposed to radiation, e.g. by phosphorescence, fluorescence, or bioluminescence.

A media system can comprise: a disk reader (e.g., an optical pickup), an electromagnetic radiation source(s) capable of inducing a luminescence emission from a luminescent material (e.g., the drive laser(s)), a luminescence detector (e.g., an optically filtered light sensing device(s), or the like; which can comprise an optical fiber) in operable communication with the electromagnetic radiation source(s). In addition to the electromagnetic radiation source(s), the media system (e.g., media drive) may comprise a comparator(s), and a media receiving portion(s) (e.g., conveying system(s), drive(s), robotic arm(s), medium (e.g., a disk) pick-up system(s), and/or the like). Additionally, it is desirable to shield the authentication system from outside light, which could affect the authentication by creating undesirable noise that could limit the performance of the system. Methods to shield the authentication system include having an opaque enclosure (e.g., optical drive enclosure where the authentication is performed only when the tray is closed), using opaque sidings/gaskets for contact measurements (e.g., measurement will be performed when the system is in contact with the medium and the outside light is blocked by the gasket).

When an authentic medium is placed in the media drive, the drive laser excites a fluorophore in the media, producing a luminescent emission from the medium (e.g., from the read side of a data storage medium substrate, where the substrate, a label, and/or a layer on the substrate, individually, comprise a fluorophore). The luminescence detector then detects the emission such that the emission can be employed to determine the authenticity of the disk. For example, when an optical medium is inserted into an optical drive, the two lasers of the drive are turned on in sequence and an algorithm is applied to identify the type of disk (optical medium). Once the type of disk is known, the appropriate laser is turned off. While the lasers identify the type of disk, at least one of the lasers excites a fluorophore in the optical medium (if present). A detector attached to the disk reader detects the luminescence emission of the fluorophore (e.g., over time). The fluorophore signature (e.g., spectral, temporal, intensity, ratiometric, and/or other features) is employed to identify the authenticity of the disk. If the disk is authentic, the process continues (e.g., the disk is read and/or written to, accordingly). However, if the disk is not authentic, the read and/or write process is prevented. Optionally, once the disk has been identified as counterfeit, one or more of the following actions can be performed: the drive can open to eject the disk, the drive can lock to prevent removal of the disk, the disk's status of not being authentic can be reconfirmed, the disk can be marked to inhibit future use of the disk, the drive can shut off, the drive can display a warning (e.g., counterfeit disk, signal a need for service), the drive send a message to the manufacturer (if connected to an appropriate service), among other actions, as well as combinations comprising at least one of the foregoing.

In one embodiment, the light sensing device can comprise a luminescence detector having a spectral sensitivity range that includes at least a portion of the spectral distribution (e.g., the visible spectral distribution) of the fluorophore intended to be detected (i.e., the luminescence emission wavelength range emitted by an authentic medium). Desirably, at least one of the light sensing devices includes a desired photoluminescence near peak emission wavelength (e.g., ±20 nm from the desired peak photoluminescent emission wavelength), with at least one of the light sensing devices including the desired photoluminescence peak emission wavelength more desirable.

In one embodiment, authentication of data storage media can be accomplished using a disk drive that further includes the luminescence detector, e.g., attached to the disk reader. The energy used to excite the fluorophore (if present) can be provided by the drive laser (e.g., the laser used to read from and/or write to the medium). If the system comprises multiple lasers, one or more of the lasers can be used. Therefore, the authentication system can be employed in various detection applications and devices, including kiosk machines (e.g., machines capable of disposing audio and/or visual data selected from a content library onto a disc), optical drives (e.g., CD/DVD devices, and the like), credit card/debit card readers, passport readers, casino chip authentication devices, part authentication/sorting machines, and the like. Although the system and device are described herein in relation to storage disks and disk drives, it is understood that the system and method apply to other storage media, including those discussed above (e.g., credit card/debit cards, passports, casino chips, personal identification (e.g., driver's license, employment identification card, visa, membership card, and the like), and the like), and their machines (e.g., credit card/debit card readers, passport readers, personal identification readers, casino chip authentication devices, part authentication/sorting machines, and the like).

In another embodiment, the authentication system can be an authentication device that is part of a data device (e.g., a device capable of reading from and/or writing to a data storage medium (wherein writing to includes all forms of disposing data onto/in the medium)). In this application, the authentication device is capable of generating one or more detected analog signature(s) from a read side of a data storage medium, with two or more signatures preferred. The measurement device can measure luminescence. A detected signature generated from the luminescence is used by a comparator capable of determining if the detected signature is from an authentic medium.

The comparator is in operable communication with the measurement device and with an information device. The information device is capable of reading from and/or writing to the authentic medium, in one or more sessions. The comparator can accept an authentic, or reject a non-authentic, medium, for example, so that the information device will read from/write to the medium or refuse to read from/write to the medium. Optionally, the data device can have a medium holder such that data storage media can be stored in the device for future use, and/or a handling system for receiving the data storage medium from an external source (such as a recordable or rewritable optical disc that does not contain data but may contain digital identification information). The handling system can allow a medium to be inserted by a customer into a kiosk machine. Optionally, the data device can employ the authentication system as the authentication device.

Any article that can be received in the authentication system can be authenticated. The authentic article should have a tag that, when contacted by energy, fluoresces such that the luminescence can be compared to a reference signature. For example, exemplary data storage media include media that are capable of producing a detectable signature (e.g., detectable luminescence emission (e.g., a medium comprising a tag or optical identifier that can be excited at the wavelength of the read and/or write laser(s) of the disk drive)). Data storage media include, for example, optical and magneto-optical media formats, such as compact discs (CD) (e.g., recordable compact disc (CD-R), rewritable compact disc (CD-RW), and the like), magneto-optical discs, digital versatile discs (e.g., DVD-5, DVD-9, DVD-10, DVD-18, DVD-R, DVD-RW, DVD+RW, DVD-RAM, HD-DVD, and the like), Blu-Ray discs, enhanced video discs (EVD), and recordable and rewritable Blu-Ray discs, and the like, as well as combinations comprising at least one of the foregoing (e.g., hybrid disks comprising, for example, CD and DVD formatting). The detectable luminescence can be produced from any portion of the media, e.g., a substrate, coating, bonding layer, and/or the like. Generally, the data storage media comprises a substrate, with one or more data storage portions(s) (e.g., magnetic, magneto-optic, optic, and the like; wherein the portion may be a layer of material and/or surface features (pits, grooves, lands, and the like)), reflective layer(s), semi-reflective layer(s), protective layer(s), dielectric layer(s), insulating layer(s), adhesive layer(s), and the like, as well as combinations comprising at least one of the foregoing.

The substrates can have a thickness of about 0.3 mm to about 2 mm, or, more specifically, about 0.3 mm to about 1.5 mm, or, more specifically, about 0.6 mm to about 0.2 mm. Examples of substrate materials include, amorphous, crystalline, and/or semi-crystalline thermoplastic materials, such as: polyvinyl chloride, polyolefins (including linear and cyclic polyolefins and including polyethylene, chlorinated polyethylene, polypropylene, and the like), polyesters (including polyethylene terephthalate, polybutylene terephthalate, polycyclohexylmethylene terephthalate, and the like), polyamides, polysulfones (including hydrogenated polysulfones, and the like), polyimides, polyether imides, polyether sulfones, polyphenylene sulfides, polyether ketones, polyether ether ketones, ABS resins, polystyrenes (including hydrogenated polystyrenes, syndiotactic and atactic polystyrenes, polycyclohexyl ethylene, styrene-co-acrylonitrile, styrene-co-maleic anhydride, and the like), polybutadiene, polyacrylates (including polymethylmethacrylate, methyl methacrylate-polyimide copolymers, and the like), polyacrylonitrile, polyacetals, polycarbonates, polyphenylene ethers (including those derived from 2,6-dimethylphenol and copolymers with 2,3,6-trimethylphenol, and the like), ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, polytetrafluorethylene, as well as thermosetting resins such as epoxy, phenolic, alkyds, polyester, polyimide, polyurethane, mineral filled silicone, bis-maleimides, cyanate esters, vinyl, and benzocyclobutene resins, in addition to combinations, blends, copolymers, mixtures, reaction products, and composites comprising at least one of the foregoing.

In order to be able to authenticate the data storage medium, the medium (e.g., the polymer (such as the substrate)) should include an identifier, e.g., a taggant (which term is used herein interchangeably with the term "tag") such as a luminescent dye, or the like, capable of producing a detectable luminescence emission when excited. Optionally, the polymer may exhibit intrinsic photoluminescence such that it is not necessary to add a taggant in order to produce a detectable photoluminescence. For example, Fries Product may be detected in polycarbonate by use of luminescence (e.g., fluorescence) spectroscopy. In another embodiment, a fluorescent monomer is copolymerized into the backbone or endcap of the polymer. Optionally, the media can comprise an optically variable tag, e.g., a compound that has a luminescence emission that changes in intensity and/or wavelength as a function of time. In one embodiment, the medium may be designed to be evaluated several times, i.e., the authenticating signal is repeatable, while in other embodiments the authenticating signal may be capable of evaluation only once due to the use of optically variable tags that, for example, degrade after one or more authentication sequences. In one exemplary embodiment, the authenticatable polymer will comprise an optically variable tag that can be authenticated multiple times, for example, at various points during use in an optical device or kiosk.

Suitable optically variable tags include luminescent materials that are selected to be chemically compatible with the polymer and have a heat stability consistent with engineering plastics compounding and in particular with the processing conditions of the portion of the media in which it is included (e.g., the polymer substrate). In an exemplary embodiment, the luminescent tags are selected from classes of dyes that exhibit high robustness against ambient environmental conditions and temperature stability of greater than or equal to about 350° C., or, more specifically greater than or equal to about 375° C., and even more specifically greater than or equal to about 400° C. Desirably the tag(s) absorbs in the near-infrared (e.g., at about 650 and/or about 780 nm; which is the wavelengths of the lasers used in many optical drives), and/or in the visible spectrum (e.g., at about 405 nm, the wavelength of a blue laser). Excitation at other wavelengths can also be acceptable, depending upon the laser (excitation source) available.

Possible optically variable tags include oxadiazole derivatives, luminescent conjugated polymers, and the like. Illustrative examples of suitable luminescent conjugated polymers are blue emitting luminescent polymers, such as poly-paraphenylenevinylene derivatives. Illustrative examples of suitable oxadiazole derivatives include oxadiazole derivatives substituted with a biphenyl or substituted biphenyl in the 2-position and with a phenyl derivative in the 5-position. For example, tert-butyl phenyl oxadiazole, bis(biphenylyl) oxadiazole, as well as mixtures comprising at least one of these tags.

Alternatively, and or in addition, the tag may be a non-optically variable compound, and optionally luminescent tags that are selected to enhance the signal from optically variable tags when used in combination. Luminescent tags include an organic fluorophore, an inorganic fluorophore, an organometallic fluorophore, a phosphorescent material, a luminescent material, a semi-conducting luminescent nanoparticle (also referred to as "quantum dots" (e.g., CdSe, CdTe, CdS, ZnS, $Cd_3P_2$, PbSe, including core-shell particles such as CdSe/ZnS, CdTe/CdS, InGaP/ZnS, such as those commercialized by Evident Technologies, Troy, N.Y., USA)), as well as combinations comprising at least one of the foregoing tags.

It is desirable to have luminescent tags hidden behind the matrix absorption, wherein the matrix is as the backbone absorption from the medium (e.g., in the substrate) or from any additive or colorant present in the substrate other than the tag. Alternatively, it is desirable to have luminescent tags with a peak excitation wavelength outside the visible region (e.g., in the ultraviolet range) and a peak emission in the visible or in the near infrared region of the spectrum. When the difference between the excitation and the emission peak is greater than about 50 nm, these compounds are usually referred to as long (positive) Stokes shift dyes. In an exemplary embodiment, the luminescent tags are selected from the classes of long Stokes shift dyes that are excited by long ultraviolet wavelengths and emit in the visible region.

Illustrative luminescent tags include, for example, dyes such as polyazaindacenes and/or coumarins (including those set forth in U.S. Pat. No. 5,573,909); lanthanide complexes, hydrocarbon and substituted hydrocarbon dyes; polycyclic aromatic hydrocarbons; scintillation dyes (e.g., oxazoles and oxadiazoles); aryl- and heteroaryl-substituted polyolefins ($C_2$-$C_8$ olefin portion); carbocyanine dyes; phthalocyanine dyes and pigments; oxazine dyes; carbostyryl dyes; porphyrin dyes; acridine dyes; anthraquinone dyes; anthrapyridone dyes; naphtalimide dyes; benzimidazole derivatives; arylmethane dyes; azo dyes; diazonium dyes; nitro dyes; quinone imine dyes; tetrazolium dyes; thiazole dyes; perylene dyes; perinone dyes; bis-benzoxazolylthiophene (BBOT); xanthene dyes (e.g., thioxanthene dyes); indigoid dyes (e.g., thioindigoid dyes); chromones dyes, flavones dyes, as well as derivatives comprising at least one of the luminescent tags disclosed herein, and combinations comprising at least one of the luminescent tags disclosed herein. Luminescent tags also include anti-Stokes shift dyes that absorb in the near infrared wavelength and emit in the visible wavelength.

The following is a partial list of some luminescent dyes: 5-amino-9-diethyliminobenzo(a)phenoxazonium perchlorate7-amino-4-methylcarbostyryl, 7-amino-4-methylcoumarin, 7-amino-4-trifluoromethylcoumarin, 3-(2'-benzimidazolyl)-7-N,N-diethylaminocoumarin, 3-(2'-benzothiazolyl)-7-diethylaminocoumarin, 2-(4-biphenylyl)-5-(4-t-butylphenyl)-1,3,4-oxadiazole, 2-(4-biphenylyl)-5-phenyl-1,3,4-oxadiazole, 2-(4-biphenyl)-6-phenylbenzoxazole-1,3,2,5-bis-(4-biphenylyl)-1,3,4-oxadiazole, 2,5-bis-(4-biphenylyl)-oxazole, 4,4'-bis-(2-butyloctyloxy)-p-quaterphenyl, p-bis(o-methylstyryl)-benzene, 5,9-diaminobenzo(a)phenoxazonium perchlorate, 4-dicyanomethylene-2-methyl-6-(p-dimethylaminostyryl)-4H-pyran, 1,1'-diethyl-2,2'-carbocyanine iodide, 1,1'-diethyl-4,4'-carbocyanine iodide, 3,3'-diethyl-4,4',5,5'-dibenzothiatricarbocyanine iodide, 1,1'-diethyl-4,4'-dicarbocyanine iodide, 1,1'-diethyl-2,2'-dicarbocyanine Iodide, 3,3'-diethyl-9,11-neopentylenethiatricarbocyanine Iodide, 1,3'-diethyl-4,2'-quinolyloxacarbocyanine iodide, 1,3'-diethyl-4,2'-quinolylthiacarbocyanine iodide, 3-diethylamino-7-diethyliminophenoxazonium perchlorate, 7-diethylamino-4-methylcoumarin, 7-diethylamino-4-trifluoromethylcoumarin, 7-diethylaminocoumarin, 3,3'-diethyloxadicarbocyanine iodide, 3,3'-diethylthiacarbocyanine iodide, 3,3'-diethylthiadicarbocyanine iodide, 3,3'-diethylthiatricarbocyanine iodide, 4,6-dimethyl-7-ethylaminocoumarin, 2,2'-dimethyl-p-quaterphenyl, 2,2-dimethyl-p-terphenyl, 7-dimethylamino-1-methyl-4-methoxy-8-azaquinolone-2,7-dimethylamino-4-methylquinolone-2,7-dimethylamino-4-trifluoromethylcoumarin, 2-(4-(4-dimethylaminophenyl)-1,3-butadienyl)-3-ethylbenzothiazolium perchlorate, 2-(6-(p-dimethylaminophenyl)-2,4-neopentylene-1,3,5-hexatrienyl)-3-methylbenzothiazolium perchlorate, 2-(4-(p-dimethylaminophenyl)-1,3-butadienyl)-1,3,3-trimethyl-3H-indolium perchlorate, 3,3'-dimethyloxatricarbocyanine Iodide, 2,5-Diphenylfuran, 2,5-diphenyloxazole, 4,4'-diphenylstilbene, 1-ethyl-4-(4-(p-dimethylaminophenyl)-1,3-butadienyl)-pyridinium derchlorate, 1-ethyl-2-(4-(p-dimethylaminophenyl)-1,3-butadienyl)-pyridinium perchlorate, 1-ethyl-4-(4-(p-Dimethylaminophenyl)-1,3-butadienyl)-quinolium perchlorate, 3-ethylamino-7-ethylimino-2,8-dimethylphenoxazin-5-ium perchlorate, 9-ethylamino-5-ethylamino-10-methyl-5H-benzo(a)phenoxazonium perchlorate, 7-ethylamino-6-methyl-4-trifluoromethylcoumarin, 7-ethylamino-4-trifluoromethylcoumarin, 1,1',3,3,3',3'-hexamethyl-4,4',5,5'-dibenzo-2,2'-indotricarboccyanine Iodide, 1,1',3,3,3',3'-hexamethylindodicarbocyanine Iodide, 1,1',3,3,3',3'-hexamethylindotricarbocyanine iodide, 2-methyl-5-t-butyl-p-quaterphenyl, N-methyl-4-trifluoromethylpiperidino-<3,2-g>coumarin, 3-(2'-N-methylbenzimidazolyl)-7-N,N-diethylaminocoumarin, 2-(1-naphthyl)-5-phenyloxazole, 2,2'-p-Phenylen-bis(5-phenyloxazole), 3,5,3"",5"'-tetra-t-butyl-p-sexiphenyl, 3,5,3"",5"'-Tetra-t-butyl-p-quinquephenyl, 2,3,5,6-1H,4H-tetrahydro-9-acetylquinolizino-<9,9a, 1-gh>coumarin, 2,3,5,6-1H,4H-tetrahydro-9-carboethoxyquinolizino-<9,9a, 1-gh>coumarin, 2,3,5,6-1H,4H-tetrahydro-8-methylquinolizino-<9,9a, 1-gh>coumarin, 2,3,5,6-1H,4H-tetrahydro-9-(3-pyridyl)-quinolizino-<9,9a, 1-gh>coumarin, 2,3,5,6-1H, 4H-tetrahydro-8-trifluoromethylquinolizino-<9,9a, 1-gh>coumarin, 2,3,5,6-1H,4H-tetrahydroquinolizino-<9, 9a,1-gh>coumarin, 3,3',2",3'"-tetramethyl-p-quaterphenyl, 2,5,2"",5'"-tetramethyl-p-quinquephenyl, P-terphenyl, P-quaterphenyl, Nile Red, Rhodamine 700, Oxazine 750, Rhodamine 800, IR 125, IR 144, IR 140, IR 132, IR 26, IR5, diphenylhexatriene, diphenylbutadiene, tetraphenylbutadiene, naphthalene, anthracene, 9,10-diphenylanthracene, pyrene, chrysene, rubrene, coronene, phenanthrene; among others.

Luminescent tags may include fluorescent nanoparticles having a size (measured along a major diameter) of about 1 nanometer (nm) to about 50 nanometers. Exemplary luminescent nanoparticles include rare earth aluminates (such as strontium aluminates doped with europium and dysprosium, and the like); semi-conducting nanoparticles (such as CdS, ZnS, $Cd_3P_2$, PbS, and the like); and the like, as well as combinations comprising at least one of the foregoing. In one embodiment, luminescent tags comprising perylenes such as anthra[2,1,9-def:6,5,10 -d'e'f']diisoquinoline-1,3,8,10 (2H, 9H)-tetrone, 2,9-bis[2,6-bis(1-methyethyl)phenyl]-5,6,12, 13-tetraphenoxy are utilized as the luminescent tags.

The concentration of the luminescent tags depends on the quantum efficiency of the tag, excitation and emission wavelengths, and employed detection techniques, and will generally be present in an amount of about $10^{-18}$ percent by weight to about 2 percent by weight of the substrate (or layer in which the tag is present), optionally in an amount of about $10^{-15}$ percent by weight to about 0.5 percent, and typically in an amount of about $10^{-12}$ percent by weight to about 0.05 percent by weight.

To further enhance authentication, the polymer compositions may additionally contain colorants. These colorants may, for example, impart a specific appearance to the tagged polymer or tagged data storage media under normal lighting conditions (e.g., daylight). To enable facile and accurate authentication of the storage media, it is desirable that any colorants used do not interfere with the luminescence emission. For example, the colorant could exhibit no or only very weak luminescence under UV excitation compared to the taggant (e.g., fluorescent dye). Suitable colorants may include non-fluorescent derivatives of the following dye families: anthraquinones, methine, perinones, azo, anthrapyridones, quinophtalones, and the like, as well as combinations comprising at least one of the foregoing colorants.

It is noted that the above media compositions as well as taggants and optical identifiers are merely exemplary. The disclosed devices and systems can detect various taggants and/or identifiers on various articles.

The authentication system can comprise one or multiple devices for receiving the luminescent emission. These devices can include light sensing devices such as, photodiodes (e.g., optically filtered photodiodes, RGB (red-green-blue) photodiodes, and the like), photovoltaic photodetectors, photoconductive photodetectors, photomultiplier tubes, charge coupled devices (CCD), light to frequency converters, and the like, as well as combinations comprising at least one of these light sensing devices.

In addition the light sensing device may be a filtered photodetector (e.g., filtered with a bandpass filter), such that emissions are detected at a particular wavelength, wherein the desired wavelength is based upon the particular tag (e.g., optical identifier) to be detected. Any suitable bandpass filter may be used, with the bandwidth chosen dependent upon the desired accuracy and type of light sensing device. For example, the filter can be a 10 nanometer (nm) bandpass filter (e.g., a filter that receives emissions only in a bandwidth of 10 nm (e.g., 480 nm to 490 nm, or 550 nm to 560 nm, etc.), 20 nm bandpass filter, 30 nm bandpass filter, 40 nm bandpass filter, 60 nm bandpass filter, or the like.

The number of light sensing devices employed should be sufficient to identify a desired luminescent tag. One or more light sensing devices (e.g., fiber optic) can be employed, e.g., attached to the disk reader of the optical drive (e.g., the reader that translates over the disk to read the various portions of the disk). Greater than or equal to three light sensing devices can be employed to enhance the accuracy of the identification (e.g., greater than or equal to three optically filtered photodiodes), specifically, greater than or equal to four light sensing devices, more specifically, greater than or equal to eight light sensing devices, and even more specifically, greater than or equal to ten photodiodes, wherein the light sensing devices can be a combination of filtered and unfiltered, with greater than or equal to about three optically filtered light sensing devices desirable. The upper limit on the number of light sensing devices is based upon space limitations and cost, while the lower limit is based upon a sufficient number to obtain the desired identification capability and/or desired accuracy. Optionally, redundant light sensing devices and/or sources may be employed in order to improve authentication reliability and/or to reduce/avoid maintenance for the lifetime of the authentication device.

In one embodiment, the authentication system comprises three optically filtered light sensing devices (e.g., optically filtered photodiodes) that optionally allow for RGB color determination. These optically filtered light sensing devices are capable of detecting analog emission intensity in a spectral sensitivity range with each light sensing device having a different device spectral sensitivity range which includes at least a portion of (and is desirably within) the visible multi-wavelength spectral distribution of one of the light sources. Again, for accuracy, the device spectral sensitivity range of at least one (more specifically at least two, and even more specifically, at least three) of the light sensing devices is disposed in at least a portion of the photoluminescent emission wavelength range of the optical identifier (e.g., the fluorescent tag). In other words, if the luminescent emission wavelength range is 400 nm to 500 nm, the first light sensing device can have a spectral sensitivity range of 380 nm to 425 nm, the second light sensing device can have a spectral sensitivity range of 450 nm to 480 nm, and the third light sensing device can have a spectral sensitivity range of 475 nm to 510 nm. In an alternative exemplary system, if the luminescent emission wavelength range is 400 nm to 500 nm, the first light sensing device can have a spectral sensitivity range of 400 nm to 425 nm, the second light sensing device can have a spectral sensitivity range of 435 nm to 455 nm, and the third light sensing device can have a spectral sensitivity range of 475 nm to 510 nm. In yet another embodiment where the luminescent emission wavelength range is 400 nm to 500 nm, with a peak emission wavelength of 475 mm, the first light sensing device can have a spectral sensitivity range of 400 nm to 425 nm, the second light sensing device can have a spectral sensitivity range of 435 nm to 455 nm, and the third light sensing device can have a spectral sensitivity range of 460 nm to 475 nm. Optionally, additional light sensing device(s) having a spectral sensitivity range greater than the peak emission wavelength can also be employed.

In one embodiment, the first light sensing device is a green filtered photodiode, the second light sensing device is a blue filtered photodiode, and the third light sensing device is a red filtered photodiode. Optionally, in addition to the filtered light sensing devices, a light sensing device that is not filtered (i.e., unfiltered) in the visible multi-wavelength spectral distribution of one of the light sources may be used. Note that the term "unfiltered" light sensing device refers to the absence of selective wavelength filtration in the visible range. The "unfiltered" light sensing device may include a window or filter to block ultraviolet or near infrared wavelengths that could interfere with the detection of the analog signature.

In another embodiment, the light source is the drive laser(s). The light sensing device (e.g., luminescence detector) can be disposed near the drive reader(s), e.g., attached to the drive readers so as to translate across the disk with the drive reader(s) and obtain luminescence (e.g., fluorescence) emission over time.

The spectral sensitivity range of each of the various light sensing devices is desirably different (although redundancy in the system is also contemplated). One or more of the light sensing devices can have a narrow device spectral sensitivity bandwidth (i.e., less than or equal to 60 nm); for example, 5 nm to 65 nm, or peak ± less than or equal to 30 nm. Specifically, a combination of the light sensing devices desirably covers the wavelengths of about 360 nm to about 780 nm, with coverage of the wavelengths of about 400 nm to about 780 nm acceptable, and coverage of about 400 nm to about 700 nm more practical while allowing good color determination.

The light sensing device(s) may have a device spectral sensitivity bandwidth of less than or equal to 40 nm, specifically a device spectral sensitivity bandwidth of less than or equal to 20 nm, and more specifically a device spectral sensitivity bandwidth of less than or equal to 10 nm. Various embodiments of light sensing device combinations comprise 1, 2, 3, or more light sensing devices having a narrow device spectral sensitivity bandwidth, in combination with 0, 1, 2, 3, or more unfiltered light sensing devices (wherein unfiltered is in reference to in the range of the spectral distribution of the multi-wavelength light source).

An additional light sensing device (e.g., filtered photodiode) may be employed having a peak spectral sensitivity wavelength corresponding to a wavelength at which the luminescence emission band has an intensity of less than or equal to about 1% of its peak intensity. For example, a fourth peak spectral wavelength can be a wavelength of less than or equal to ±15 nm of a wavelength where the emission intensity of the luminescence tag became zero (i.e., is no longer detectable).

Also optional is the use of a clear (i.e., unfiltered) photodiode. The clear photodiode can detect color across a broad spectrum, e.g., can detect a colorant, the visible portion of the absorption of a CD-R dye, metal effects, a metallic layer (e.g., a reflective layer) and/or "clear/colorless" medium, that is employed in addition to the particular tag (e.g., fluorescent). The clear photodiode typically provides information regarding the total brightness of the photoluminescent emission or the lightness/darkness of the color. It may also be used to verify that the sources are operating properly during an internal calibration or self-checking procedure.

The luminescence detector may comprise a photo multiplier tube(s), a charge-transfer device(s) (e.g., a charge-coupled device, intensified charge-transfer device, a charge-injected device, and/or the like), an optical probe(s) (e.g., a fiber-optic probe), and/or a light guiding element(s).

Media drive may optionally comprise an optical probe(s) or light guiding element(s), a temperature sensor(s), an ability to internally calibrate the luminescence detector (e.g., a highly reflective white section with or without a reference luminescent tag) and/or to check the integrity of its components, comparator(s), as well as combinations comprising at least one of the foregoing, wherein the calibration can be user initiated and/or automatic. When operating in a normal fashion, the detector may be able to return a pass/fail signal and optionally an error status signal. Note that the comparator unit may include components to perform signal processing tasks such as amplify, filter, and/or convert the analog signal from the light sensing devices to form a detected analog signature that the comparator can directly compare to an authentic analog signature.

Use of the detector in an optical device enables the authentication of the medium disposed in the device. By authenticating the medium, a determination can be made whether data (e.g., digital content) should be disposed onto or read from the medium (e.g., if the medium is authentic, data can be disposed on or read from the medium, while if it is not authentic, the device can reject the medium, and data is not read from or written to the medium). Optionally, data will be selected from a digital content library where the content is typically transferred to a recordable disc (e.g. DVD-R, CD-R, and the like). Data could be in a compressed (e.g. MP3, MPEG-2, JPEG, and the like) or non-compressed format.

Figure 7:
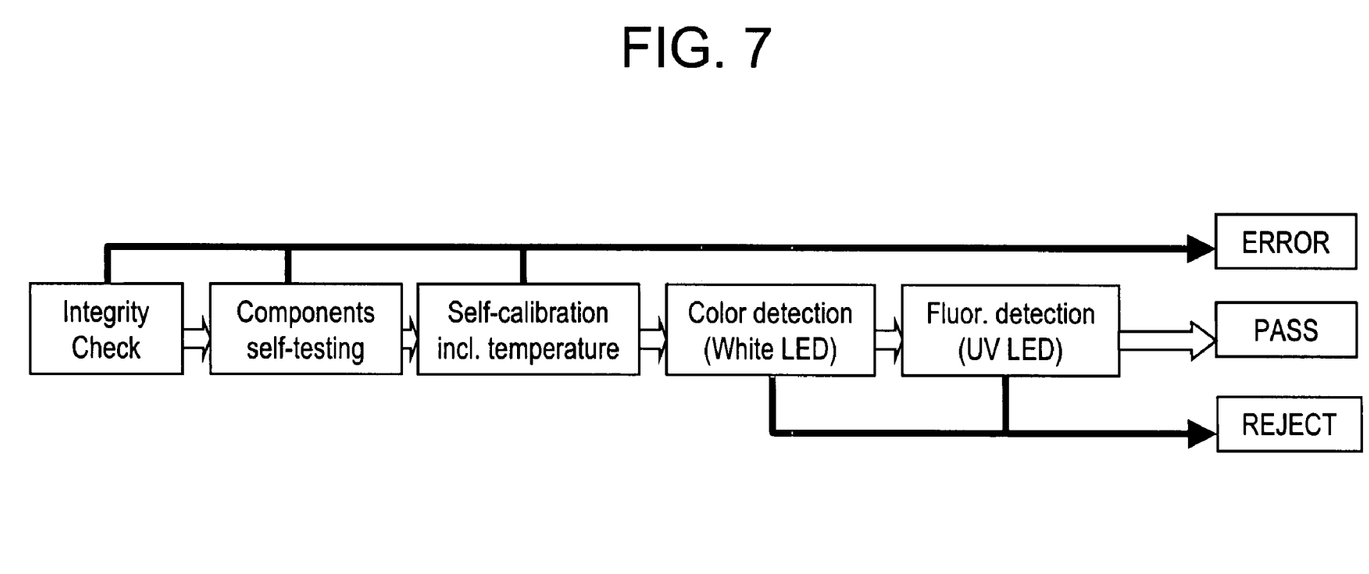
FIG. 7 is a flow chart diagram of one embodiment of a method of using the authentication system in an optical drive.

For example, the method of authenticating a data storage medium can include providing a user with authentic medium (e.g., selling authentic media to a user). Once a medium is disposed in the optical device, it is authenticated (e.g., to ensure it was properly purchased). FIG. 7 illustrates one possible method for controlling the operation of the kiosk machine based on the detection of color and/or luminescence contained on media, e.g., on a CD-R disc. During the detection, the excitation sources emit radiation that causes an authentic media to produce a photoluminescent emission at a predetermined wavelength/wavelength range. The filtered photodiodes detect the emission and provide a signal to the comparator (e.g., the intensity of the emission at the particular filtered photodiode's peak spectral sensitivity wavelength). The comparator (e.g., computer, microprocessor, logic circuit board, or the like) can compare the received signals with the expected signals to determine if the media is authentic. If the media is not authentic, the comparator can inhibit the optical device from reading from and/or writing to the media the user selected digital content.

The comparator can operate, for example, using a preexisting value of color emission and/or luminescence emission preprogrammed into a computer that is compared to the value of emissions obtained from the data storage medium being authenticated. Alternatively, the obtained value of color emission and/or luminescence emission can be compared to pre-established color and luminescence values obtained by reading a color and/or luminescence authentication code readable from the user provided data storage medium. Optionally, the authentication can include confirming the presence of a digital security identifier (serial number or code mastered on the disc, pattern of errors, digital watermark, special identifier in the table of content, special digital code in the lead-in region of the disc, sectors or clusters of data which undergo a state change when exposed to the drive laser, and the like).

Figure 8:
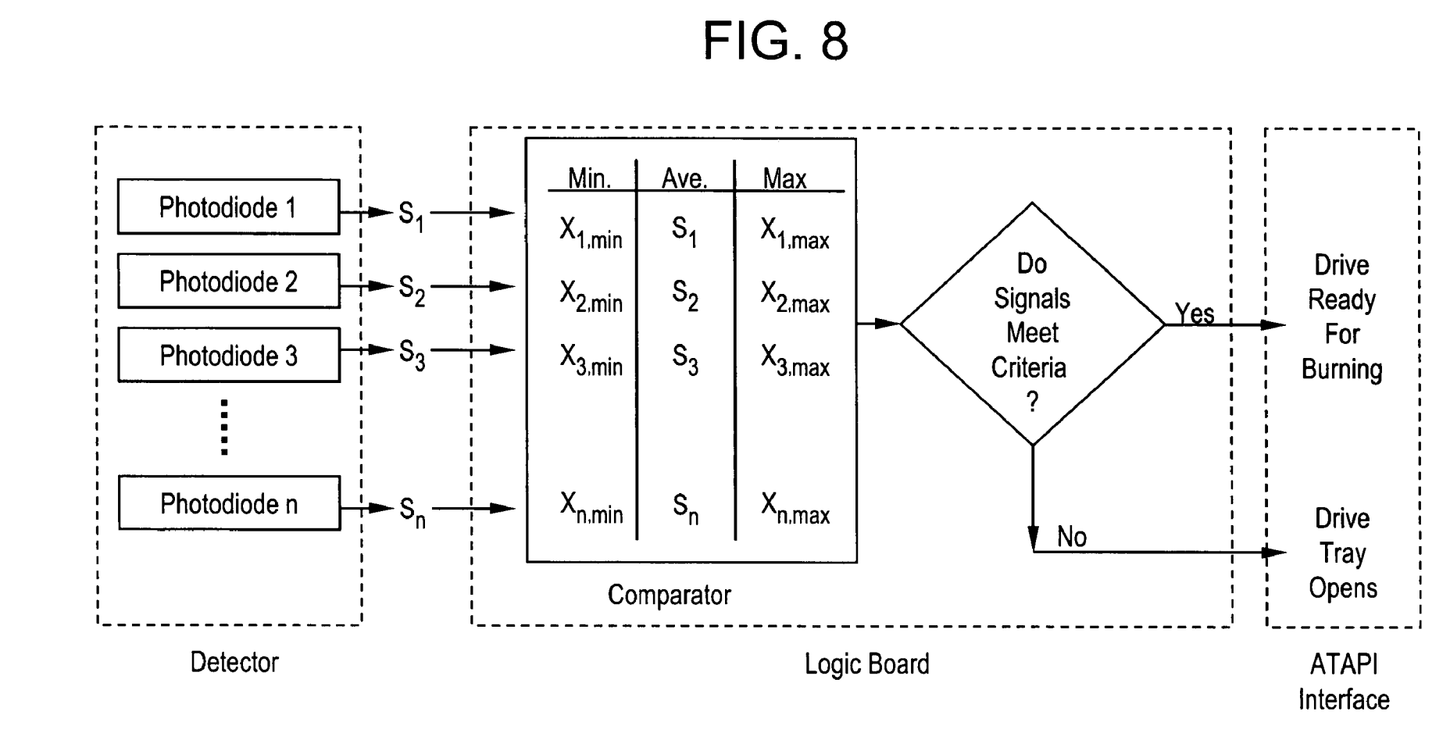
FIG. 8 is a flow chart diagram of one embodiment of a method for authenticating a data storage medium based on signals from multiple photodiodes of the authentication system in a kiosk machine.

Referring to FIG. 8, an authentication scheme for authentication of a media in a media drive (e.g., a CD-R in a kiosk or a DVD in a DVD player) is illustrated. The multiple photodiodes in the detector each detect a signal ($S_1, S_2 \ldots S_n$). The detected signal is compared to a predetermined range (upper limit $X_{1,max}, X_{2,max}, \ldots X_{n,max}$, respectively; and lower limit $X_{1,min}, X_{2,min}, \ldots X_{n,min}$, respectively). If the detected signals are authentic (i.e., $X_{1,max} \geq S_1 X_{1,min}; X_{2,max} \geq S_2 \geq S_{2,min} \ldots$, and $X_{n,max} \geq S_n \geq X_{n,min}$), the drive is ready for burning/reading ... However, if the media is not authentic (i.e., $X_{1,max} \leq S_1$, $S_1 \leq X_{1,min}$, $X_{2,max} \leq S_2$, $S_2 X_{2,min}, \ldots, X_{n,max} \leq S_n$, and/or $S_n \leq X_{n,min}$), the drive tray will open without reading or writing to the media. Alternatively, or in addition to, an error signal could be sent via the drive interface to otherwise prevent reading of and/or writing data to a non-authentic disc.

It is noted that the ranges can be established in any desired fashion, e.g., the endpoints can be inclusive or exclusive (or a combination thereof for the different signals), a media can be rejected if it fails to meet one signal criteria, or can fail only after more than one criteria have been failed. Additionally, this type of system can be part of a new media system or can be an upgrade for a current media system. The logic can be fixed or can be changeable (e.g., upgradeable), depending on the requirements and uses for the particular media authentication device. Finally, multiple logics can be employed in a device to enable it to authenticate a number of different media.

For example, the detection of the color emission and/or luminescence emission from a data storage medium containing the optical identifier may comprise exposing the user provided data storage media to light from the label and/or read side of the data storage media and collecting and analyzing luminescence and scatter which are detected from a side or an edge of the user provided data storage media. When the user provided data storage medium containing the optical identifier is authenticated, only then will the kiosk computer allow for the recordation of the user selected digital content onto the data storage media provided to the kiosk machine by the user of the kiosk machine. Preferably the kiosk machine may be contained in a tamper-proof structure to prevent alteration of the kiosk computer or other kiosk machine components.

In addition to the tag(s), the data storage medium which is authenticated and data which is disposed thereon may have additionally recorded thereon identifying information about the user, the machine in which the digital content was recorded (e.g., to make the media traceable), and the like. Some non-limiting examples of identifying information which may be additionally recorded onto the data storage medium may be the user's name, credit card information, time and date of recording, amount charged for the recording, additional security features which render the data storage medium copy-proof, and the like.

Figure 1:
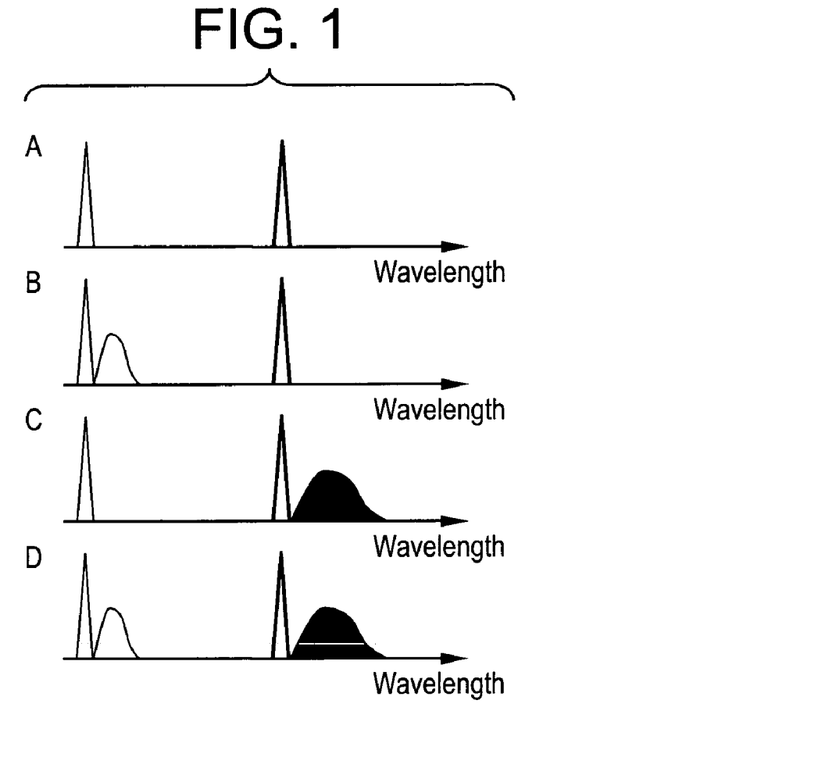
FIG. 1 is a graphical representation of the principle of identification of optical disk material using lasers of an optical drive.

As discussed above, an exemplary system comprises a luminescence detector in a media drive that uses multiple (e.g., two or more) lasers to identify the media type. The method can use the luminescence emission resulting from the disk identification process. Referring to FIGS. 1A-1D, the principle of this identification is graphically illustrated. FIG. 1A shows a response of a detector when material of the optical disk does not emit fluorescence under either 650 nm or 780 nm laser excitation. FIG. 2B shows the response of a detector when material of the optical disk emits fluorescence under only 650 nm laser excitation. FIG. 2C shows the response of a detector when material of the optical disk emits fluorescence under only 780 nm laser excitation. FIG. 2D shows the response of a detector when material of the optical disk emits fluorescence under both 650 and 780 nm laser excitation. Other possible excitation is also contemplated, such as blue laser, e.g., 405 nm.

Figure 2:
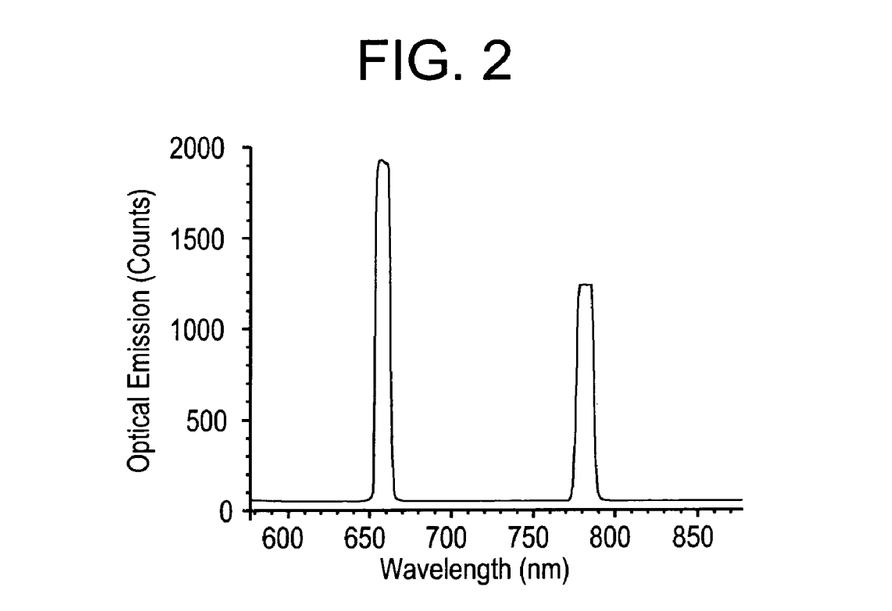
FIG. 2 are graphical representations of spectral responses of 650 nm and 780 nm lasers in an optical drive when an optical disk is started to play.
Figure 3:
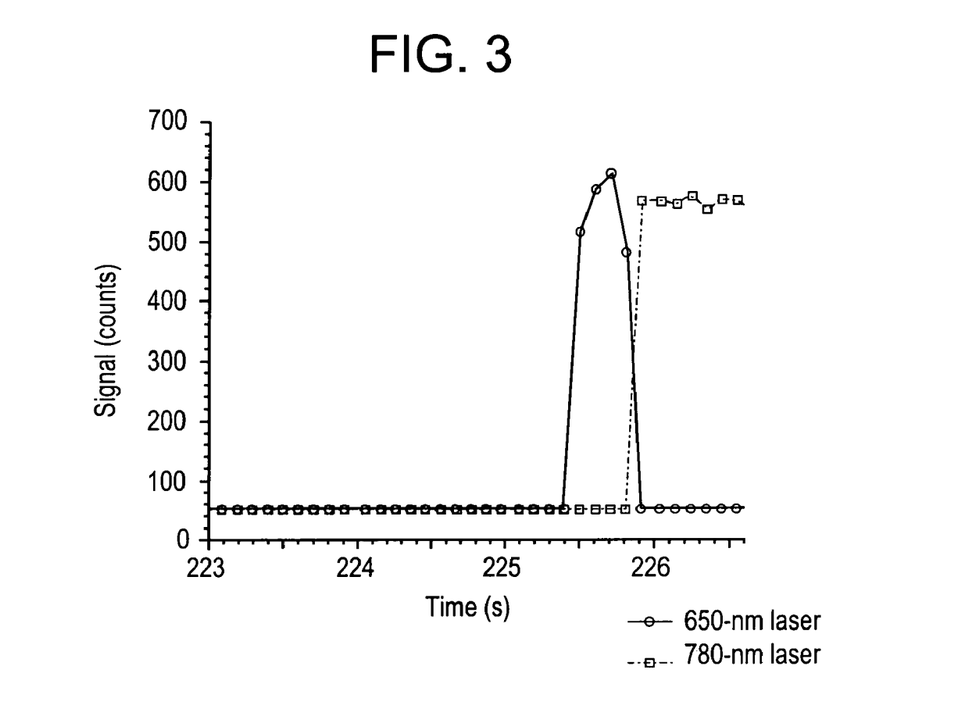
FIG. 3 are graphical representations of temporal responses of 650 nm and 780 nm lasers in an optical drive when an optical disk is started to play.

In FIGS. 2 and 3, laser emission from an optical drive was measured with a fast spectral photodetector such as an Ocean Optics spectrophotometer. FIG. 2 illustrates spectral responses of 650 nm and 780 m lasers in an optical drive when an optical disk is started to play, while FIG. 3 illustrates spectral temporal responses of 650 nm and 780 nm lasers in an optical drive when an optical disk is started to play.

Figure 4:
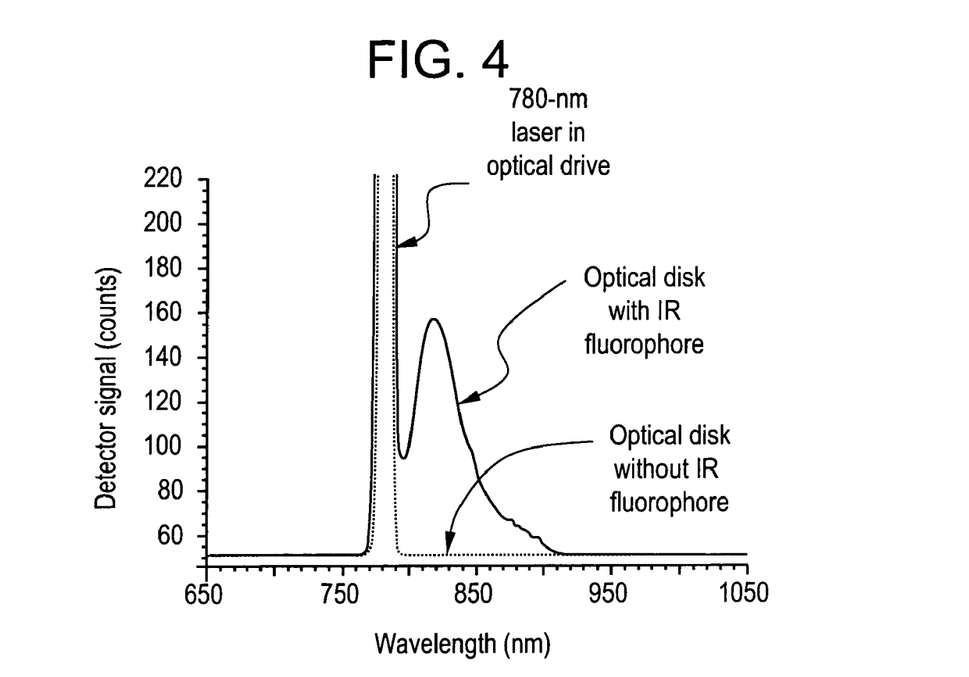
FIG. 4 is a graphical representation of spectra collected from disks with (solid line) and without (dotted line) an infrared fluorophore taggant using a laser in an optical drive.

FIG. 4 presents two spectra where one spectrum is collected from a disk that does not have an infrared fluorophore. For the disk with the fluorophore, a near infrared fluorophore was incorporated into the optical disk as a film on top of the reflective layer. Transmission fluorescence detection using an optical drive (with a 780 nm laser) was performed, which provides the smallest amount of detected fluorescence. This challenging example was selected on purpose to demonstrate the possibility of fluorescence detection in such a difficult situation. The fluorophore-free disk formed a spectrum having only a laser line (dotted line). Clearly, the fluorescence spectrum of the infrared fluorophore (solid line) is resolved with the high signal-to-noise.

Figure 5:
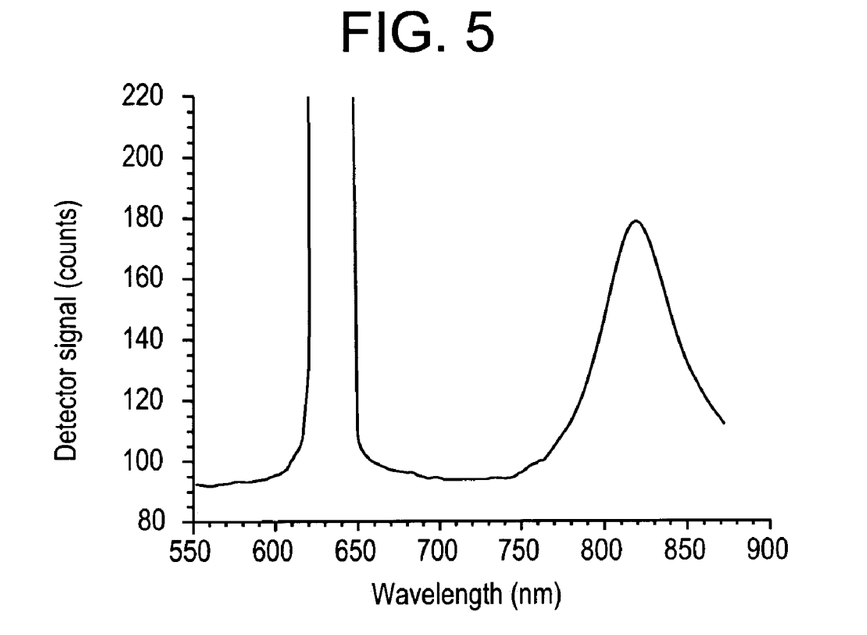
FIG. 5 is a graphical representation of fluorescence spectrum of an optical disk with a near infrared fluorophore collected with an external laser (outside the optical drive).
Figure 6:
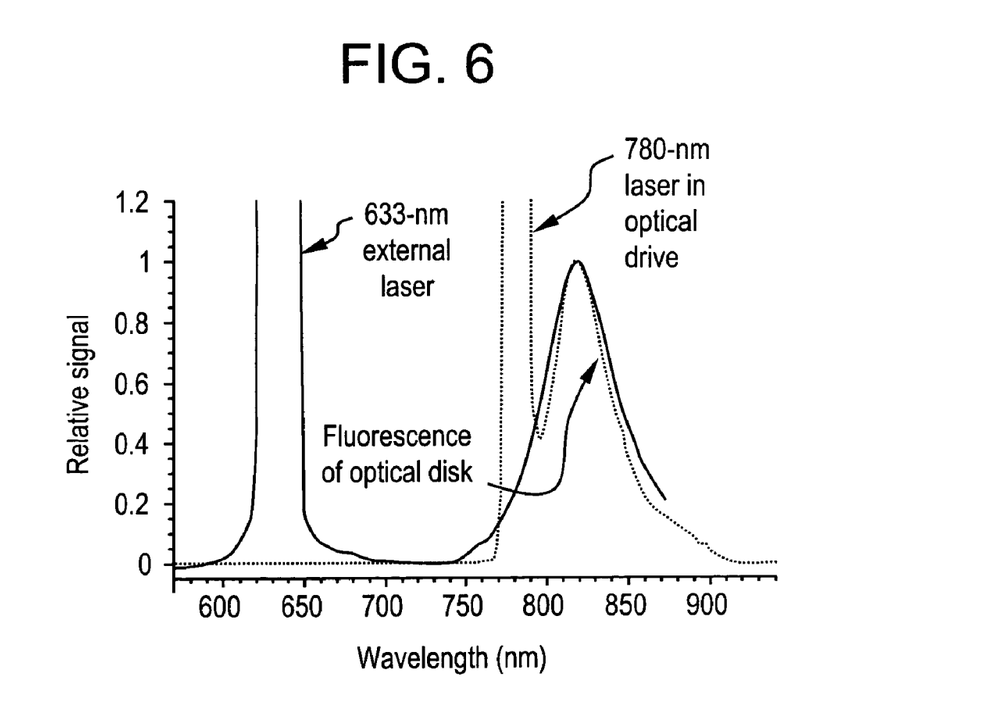
FIG. 6 is a graphical comparison of fluorescence spectra under excitation with an external laser (solid line) and an original laser in optical drive (dotted line).

To confirm the luminescence emission profile, the luminescence of the disk in FIG. 4 was further excited with an external laser at 633 nm (e.g., a laser outside the optical drive). Luminescence spectrum collected with this laser in shown in FIG. 5. A comparison of the two spectra (FIGS. 4 and 5) demonstrated a good correspondence of two profiles as illustrated in FIG. 6.

This authentication system can be used in various authentication applications, such as in media drives. It can be used to authenticate data storage media (e.g., disks such as DVDs, CDs, hybrid disks, and the like), wherein the authentication can be determined from the read side and/or from the non-read side of the media (e.g., depending upon the location of the luminescence detector(s)). For simplicity, a luminescence detector can be disposed near (e.g., attached to) a drive reader, and optionally, multiple detectors can be disposed near (e.g., attached to), one or more drive readers such that relative motion is created between the reader and the disk (e.g., so that the reader can obtain information from the disk), the detector can determine luminescence emission intensity across the disk. Therefore, based upon the emission over time, the location of the emission and the intensity can be obtained to enable the determination of authenticity.

This system, therefore, can comprise relative radial motion between the disk and the electromagnetic radiation source(s) (e.g., the drive laser(s)), as well as the mobile luminescence detector(s) (e.g., attached to the drive reader(s)). For example, the system can comprise mobile electromagnetic radiation source(s) (e.g., the drive laser(s)) and mobile luminescence detector(s) (e.g., attached to the drive reader(s)), such that the disk can be spun during authentication while the mobile electromagnetic radiation source(s) and mobile luminescence detector(s) can be radially translated. Then, by determining emissions over time, the location of the fluorophore (e.g., tag), as well as its intensity, and/or other properties, can be determined to enable authentication. If a mobile luminescence detector is employed, an auto focusing and/or tracking technique can be utilized. For example, the sensing device is mounted on a sled that can move radially relative to the media, e.g., on a rail. This sled can optionally also move up and down (on the z-axis) relative to the media, e.g., using a motor, piezoelectric device, or the like.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A media drive, comprising:
   a disk holder capable of applying a rotational force to a media disk;
   a drive laser disposed so that light from the laser will be incident on the media disk when it is disposed in the disk holder, wherein the light is capable of being used for recording on the media disk, playback of information on the media disk, or both;
   a disk reader disposed to receive data from the media disk; and
   a luminescence detector, wherein the luminescence detector comprises multiple optically filtered photodiodes;
   wherein the luminescence detector determines luminescence emission intensity across the disk at multiple predetermined wavelengths simultaneously.

2. The media drive of claim 1, wherein the luminescence detector is disposed adjacent to the disk reader.

3. The media drive of claim 1, wherein the drive laser is capable of causing a luminescence emission from a luminescent material in an authentic medium.

4. The media drive of claim 1, wherein the luminescence detector is attached to the disk reader.

5. The media drive of claim 1, wherein the luminescence detector comprises an optical fiber.

6. The media drive of claim 1, comprising an additional drive laser.

7. The media drive of claim 1, further comprising a comparator in operable communication with the luminescence detector.

8. The media drive of claim 1, wherein the luminescence detector comprises a device selected from the group consisting of a photo multiplier tube, a charge-transfer device, an optical probe, a light guiding element, and a combination comprising at least one of the foregoing.

9. The media drive of claim 1, further comprising a spectrophotometer.

10. The media drive of claim 1, wherein the media drive is configured to lock the media drive if the disk is not authenticated.

11. The media drive of claim 1, wherein the media drive is configured to mark the disk if the disk is not authenticated.

12. The media drive of claim 1, wherein the luminescence detector comprises greater than or equal to three optically filtered photodiodes.

13. A media drive, comprising:
- a disk holder capable of applying a rotational force to a media disk;
- a drive laser disposed so that light from the laser will be incident on the media disk when it is disposed in the disk holder, wherein the light is capable of being used for recording on the media disk, playback of information on the media disk, or both;
- a disk reader disposed to receive data from the media disk;
- a luminescence detector, wherein the luminescence detector comprises a spectrophotometer;
- wherein the media drive is configured to mark the disk if the disk is not authenticated.

* * * * *